Oct. 29, 1957     J. B. BLACKSTONE     2,811,089
STEERING MEANS FOR ROW CROP CULTIVATORS AND THE LIKE
Filed March 25, 1955     2 Sheets-Sheet 1

INVENTOR.
JAMES B. BLACKSTONE
BY
Knox & Knox

Oct. 29, 1957    J. B. BLACKSTONE    2,811,089
STEERING MEANS FOR ROW CROP CULTIVATORS AND THE LIKE
Filed March 25, 1955    2 Sheets-Sheet 2

INVENTOR.
JAMES B. BLACKSTONE
BY
Knox & Knox

United States Patent Office 2,811,089
Patented Oct. 29, 1957

2,811,089

STEERING MEANS FOR ROW CROP CULTIVATORS AND THE LIKE

James B. Blackstone, Brawley, Calif.

Application March 25, 1955, Serial No. 496,709

4 Claims. (Cl. 97—47.02)

The present invention relates generally to ambulant farm machines for handling drilled crops and more particularly to a steering and stabilizing means for such machines as multi-row crop cultivators, and the like.

The primary object of this invention is to provide a plurality of substantially similar row-following units one of which units, at least, is used as an attachment to a steerable ground-contacting wheel while others of said units are attached to the frame of the implement, to effect, in cooperation, a unique and dramatic improvement in accuracy or nicety in steering accompanied by greater stability and general control of the implement. For example, one unit of such a set is operatively attached to the steerable wheel or a tractor or the like carrying a row crop cultivator, while the other units of the set are operatively attached to the frame of the implement, per se, all these units of the set cooperating in a novel manner to achieve more accurate steering and stability of the implement.

Another object of this invention is to provide a steering device which is fully adjustable to fit different sizes and shapes of furrows.

Another object of this invention is to provide a steering device which does not cut into or tend to ride up out of the furrow, but remains in true alignment until intentionally lifted.

Another object of this invention is to provide a steering device which is inexpensive and practicable to manufacture.

Finally, it is an object to provide a steering device of the aforementioned character which is simple and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
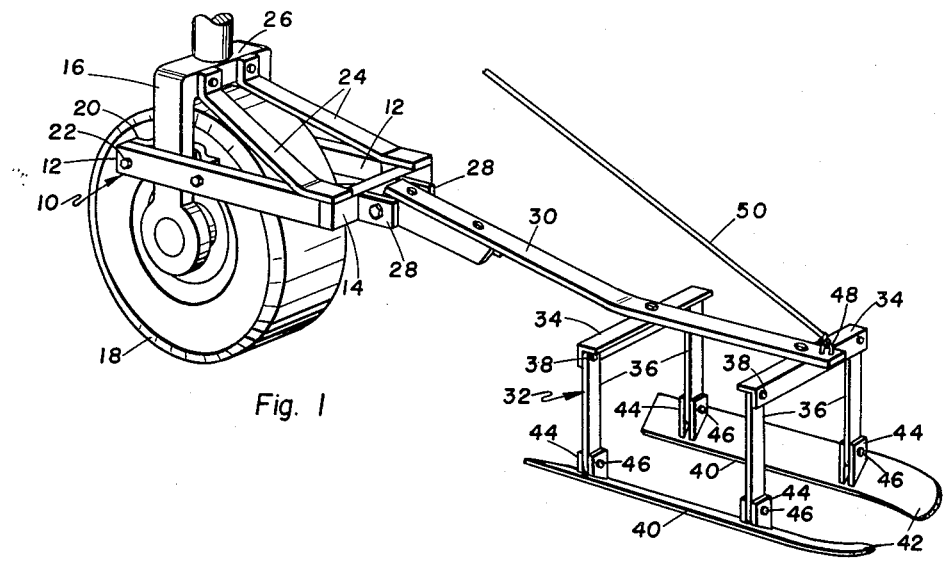
Fig. 1 is a perspective view of a unit mounted as a steering device on the front wheel assembly of a tractor.
Figure 2:
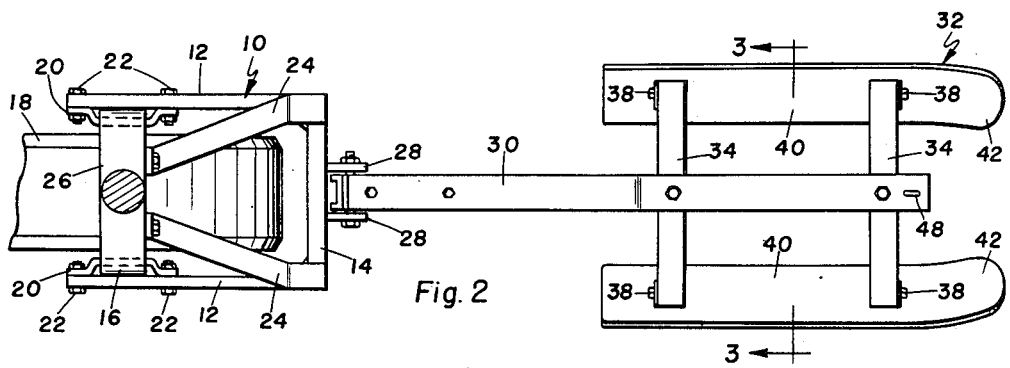
Fig. 2 is a top plan view of the unit shown in Fig. 1.

Referring now to the drawing in detail, the steering unit includes a generally U-shaped support frame 10, comprising a pair of side members 12 interconnected at one end by a cross bar 14. The side members 12 are spaced to fit outside the fork 16 of a steerable wheel 18, such as on a tractor, and are secured to the fork by clamp plates 20 passing between the fork 16 of a steerable wheel 18, such as that on a tractor, and are secured to said side members by suitable bolts 22. The support frame 10 is further braced by a pair of struts 24, each fixed at one end to an end of the cross bar 14 and at the other end to the upper or bight portion 26 of the fork 16. The cross bar 14 is disposed forwardly of the wheel 18 and extending from said cross bar are a pair of lugs 28.

Pivotally mounted to and between the lugs 28 is a forwardly extending guide arm 30 on the front end of which is a guide shoe assembly 32. This guide shoe assembly 32 comprises a pair of lateral cross arms 34 fixed beneath the guide arm 30 in longitudinally spaced relation. Depending from each end of the cross arms 34 are legs 36 which are attached to said cross arms by bolts 38. At the lower ends of the legs 36 are the guide shoes 40, each comprising an elongated plate-like member generally parallel to the guide arm 30 and having an inwardly curved nose portion 42. Fixed to each guide shoe 40 are two pairs of upstanding lugs 44 spaced longitudinally on said shoes to correspond with the spacing of the cross arms 34. The lower ends of the legs 36 fit between the paired lugs 44 and are secured by bolts 46. Fixed to the forward end of the guide arm 30 is a loop 48 to which is fastened a lifting cord 50 of rope, cable, or the like. This lifting cord 50 may be passed through a suitable guide such as the frame 51 shown in Fig. 5 and is extended to a suitable position accessible to the operator.

Figure 4:
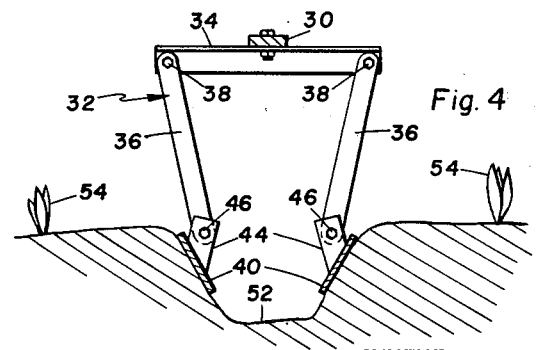
Fig. 4 is a sectional view similar to Fig. 3 showing the device adjusted to fit a furrow.
Figure 3:
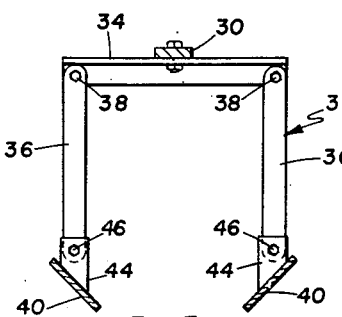
Fig. 3 is a sectional view taken on the line 3—3 of Fig. 2.

In use, the guide shoe assembly 32 is adjusted to fit the furrow being used as a guide, as shown in Fig. 4. This is accomplished by swinging the legs 36 as necessary and pivoting the guide shoes 40 to the required angle, the assembly then being locked by tightening the bolts 38 and 46. With the guide shoes 40 thus adjusted, the wheel 18 will be steered, through the agency of the guide arm 30 and the support frame 10, to follow the furrow 52.

Figure 5:
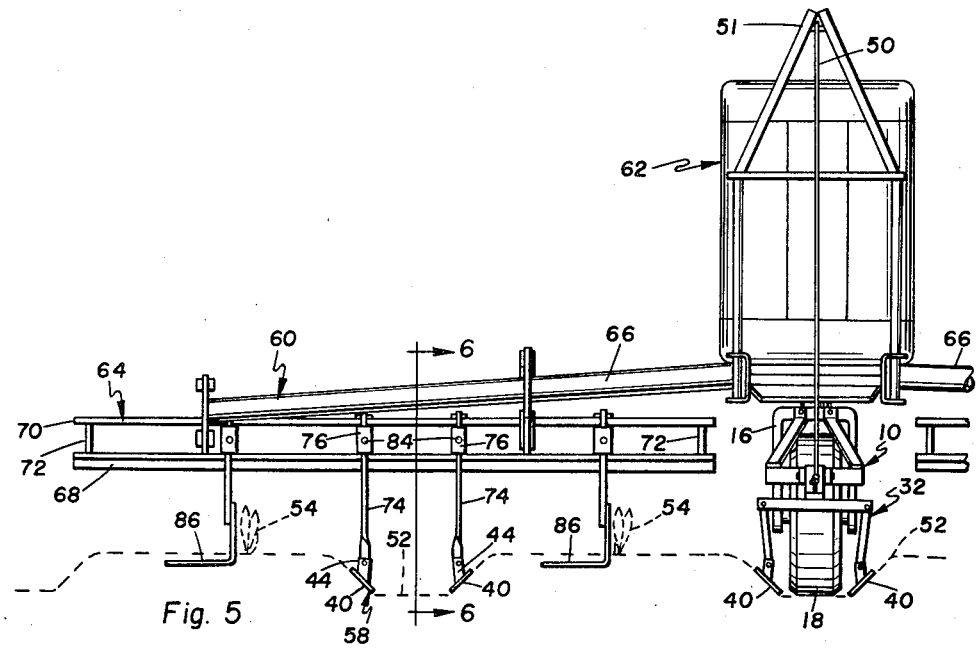
Fig. 5 is a front elevation view of a tractor carrying a multi-row crop cultivator and showing the attachment of both the steering and stabilizing units.
Figures 6, 7:
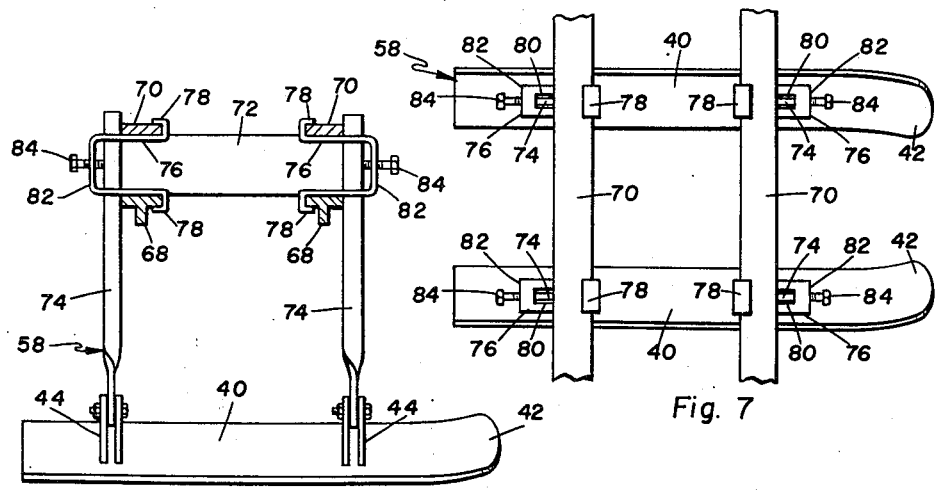
Fig. 6 is an enlarged sectional view taken on the line 6—6 of Fig. 5.
Fig. 7 is a fragmentary top plan view of the structure shown in Fig. 6.

The stabilizing unit 58 as shown in Figs. 5–7, is attached, usually in plurality, directly to the crop processing implement itself. Fig. 5 illustrates, by way of an example, a portion of a row crop cultivator 60 mounted on and extending suspended laterally from a tractor 62, it being usual to have portions of such an implement on each side of the tractor. The cultivator 60 includes a frame 64 supported by an arm 66 extending from the tractor, said frame comprising a pair of horizontally spaced lower rails 68 and a pair of upper rails 70 which are vertically spaced from the lower rails, the upper and lower rails being secured to spacer webs 72 disposed at suitable positions to form a rigid structure. The details of the structure of the implement is not critical or material with respect to this invention and may vary considerably. The stabilizing unit 58 comprises a pair of guide shoes 40 having lugs 44 thereon as previously described. Secured between the lugs 44 are four upright legs 74 which extend upwardly and are held against the outer edges of the rails 68 and 70. The legs 74 are secured by U-clamps 76 having hook portions 78 which engage the inner edges of the rails 68 and 70, as shown in Figs. 6 and 7. The legs 74 pass through slots 80 in the U-clamps 76 adjacent the bight portions 82 of said clamps and are locked by clamp bolts 84 screwed through said bight portions. The clamp bolts 84 thus hold the legs 74 tightly against the rails 68 and 70.

By loosening the clamp bolts 84, the legs 74 can be adjusted along the rails 68 and 70 and spaced to fit a furrow as indicated in dash line at 52 in Fig. 5, the guide shoes 40 being angularly adjusted to rest flat against the furrow walls. The legs 74 are also adjustable vertically to hold the cultivator 60 at the correct height.

The frame 64 also carries the crop processing implements such as the cultivator blades 86, which are secured in a manner similar to the stabilizing device. The cultivator elements are, of course, positioned to fit the spaced rows of the plants indicated at 45 and since several furrows are usually made simultaneously, the use of one furrow as a guide ensures that the cultivator will stay in alignment and not damage the plants.

Certain types of steering devices utilize wheels which ride in a furrow for guidance, but these wheels tend to cut into the earth of the furrow walls or even to ride up out of the furrow. The guide shoes 40 of the instant invention rest against a considerable area of the furrow and the inwardly curved nose portions 42 prevent the shoes from digging into the ground. The pivoted mounting of the shoe assembly on the guide arm 30 allows the shoes to follow vertical fluctuations or uneven shaping of the furrow, while its weight tends to hold the shoes in close contact with the furrow at all times. Furthermore, the fully adjustable structure of the guide shoe assembly 32 enables the device to be fitted to any furrow with considerable accuracy, so that no wandering is possible. The stabilizers 58 support the cultivator 60 firmly and guide the blades 86 more accurately by eliminating side sway and rocking of the machine, and also contribute considerably to the actual steering. Furthermore, the stabilizer units tend to minimize any tendency for the implement to yaw. Without my stabilizing means, considerable instability is inevitable in such machines due to uneven ground and resiliency of the pneumatic tires of the tractor. Using the steering and stabilizing means shown and described herein, it has been found that the implement can cultivate within one inch of a row of plants while advancing at a reasonable speed, such as the rate represented as "third gear" in farm tractors. This is considerably more accurate cultivation than is possible with other types of guiding devices. The stabilizing means is thus an important and necessary element and cooperates fully with the actual wheel steering guide.

The steering and stabilizing devices are by no means limited to use with the cultivator shown, but may be adapted to many types of multi-row crop processing machines such as planters for beans, sugar beet, corn and the like, and other agricultural implements as will be evident to those versed in the art.

Whenever necessary as, for example, at the end of a furrow, the guide shoe assembly 32 is lifted by means of the cord 50 so that the cultivator can be turned and started back in another furrow. The stabilizers 58 are lifted together with the cultivator 60 which is raised by the conventional means used on the tractor for that purpose.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. A steering and stabilizing means for attachment to an ambulant machine for row crop cultivation, comprising: a steerable ground-contacting wheel assembly; a pair of generally flat, elongated guide shoes; pairs of support legs secured to said guide shoes; an arm securable to said wheel assembly; means for securing said legs to said arm for adjustment about substantially horizontal axes, whereby the spacing of the guide shoes can be adjusted; said guide shoes having inwardly curved nose portions; and means for adjusting the angular disposition of said guide shoes relative to the corresponding legs, whereby the angular relation of the shoes can be adjusted to suit the particular slope required independently of the spacing of the shoes.

2. A steering means for attachment to a steerable component of an ambulant machine for row crop cultivation, comprising: a support frame having means for securement to the steerable component; an arm mounted at one end on said frame for pivotal movement about a horizontal axis; a guide shoe assembly fixed to the free end of said arm; said assembly including a pair of laterally extending cross arms fixed to said arm and spaced longitudinally thereof; opposed pair of legs depending from said cross arms; a pair of elongated plate-like guide shoes attached to the lower ends of said pairs of legs; said legs being angularly adjustable with reference to said cross arms and said shoes being angularly adjustable with reference to said legs.

3. A steering means for attachment to a steerable component of an ambulant machine for row crop cultivation, comprising: a support frame having means for securement to the steerable component; an arm mounted at one end on said frame for pivotal movement about a horizontal axis; a guide shoe assembly fixed to the free end of said arm; said assembly including a pair of laterally extending cross arms fixed to said arm and spaced longitudinally thereof; opposed pairs of legs depending from said cross arms; a pair of elongated plate-like guide shoes attached to the lower ends of said pairs of legs; said shoes being generally parallel to said arm and having inwardly curved nose portions at the ends remote from said frame; said legs and said shoes being individually angularly adjustable to alter the spacing and angular disposition of the shoes to fit the contours of a furrow.

4. A steering means for attachment to a steerable component of an ambulant machine for row crop cultivation, comprising: a support frame having means for securement to the steerable component; an arm mounted at one end on said frame for pivotal movement about a horizontal axis; a guide shoe assembly fixed to the free end of said arm; said assembly including a pair of generally flat, horizontally elongated and spaced, plate-like shoes mounted below and generally parallel to said arm; said shoes being spaced laterally of said arm and having inwardly curved nose portions; at least one further pair of guide shoes having legs secured thereto; clamp means on said legs for attachment to the machine laterally of said guide shoe assembly, whereby said last mentioned shoes are parallel to said first mentioned shoes; means for adjusting said last mentioned legs vertically; and means for adjusting the spacing of the shoes in each pair of shoes and the angular disposition of said shoes in relation to the corresponding legs.

References Cited in the file of this patent

UNITED STATES PATENTS

| | | |
|---|---|---|
| 921,004 | Rohan | May 11, 1909 |
| 1,209,430 | Greimann | Dec. 19, 1916 |
| 1,731,220 | Zybach | Oct. 8, 1929 |
| 1,753,712 | McCready | Apr. 8, 1930 |
| 1,850,717 | Heitshu | Mar. 22, 1932 |
| 2,156,977 | From | May 2, 1939 |